United States Patent
Grevers, Jr.

(10) Patent No.: US 8,957,936 B2
(45) Date of Patent: Feb. 17, 2015

(54) METHOD TO PREVIEW CALLER IN A VIDEO CONFERENCE SESSION

(71) Applicant: Cisco Technology, Inc., San Jose, CA (US)

(72) Inventor: Theodore Robert Grevers, Jr., Milford, MA (US)

(73) Assignee: Cisco Technology, Inc., San Jose, CA (US)

(*) Notice: Subject to any disclaimer, the term of this patent is extended or adjusted under 35 U.S.C. 154(b) by 190 days.

(21) Appl. No.: 13/657,902

(22) Filed: Oct. 23, 2012

(65) Prior Publication Data
US 2014/0111596 A1    Apr. 24, 2014

(51) Int. Cl.
*H04N 7/14*    (2006.01)
(52) U.S. Cl.
CPC ....................................... *H04N 7/14* (2013.01)
USPC ................... 348/14.01; 348/14.08; 348/14.12
(58) Field of Classification Search
CPC ......... H04N 7/14; H04N 7/142; H04N 7/147; H04N 7/148; H04N 7/15; H04N 7/152; H04M 3/4202
USPC ............ 348/14.01–14.16; 379/142.01, 93.23; 455/415
See application file for complete search history.

(56) References Cited

U.S. PATENT DOCUMENTS

| | | | |
|---|---|---|---|
| 2002/0172338 A1* | 11/2002 | Lee et al. ................. | 379/142.01 |
| 2008/0186377 A1* | 8/2008 | Eriksson et al. ........... | 348/14.01 |
| 2012/0278384 A1* | 11/2012 | Synnergren et al. .......... | 709/203 |
| 2013/0027504 A1* | 1/2013 | Zhang ........................ | 348/14.08 |

FOREIGN PATENT DOCUMENTS

EP    1 892 934 A1    2/2008

OTHER PUBLICATIONS

International Search Report dated Feb. 3, 2014 cited in Application No. PCT/US2013/065943, 12 pgs.

* cited by examiner

*Primary Examiner* — Melur Ramakrishnaiah
(74) *Attorney, Agent, or Firm* — Merchant & Gould

(57) ABSTRACT

The concept of caller identification (ID) may be enhanced by taking advantage of video by allowing a call recipient to see who is calling on an incoming video call. The call recipient may be allowed to make a decision to accept or decline the incoming video call based upon who the call recipient sees (e.g. through a live video stream) attempting to contact them.

27 Claims, 4 Drawing Sheets

METHOD TO PREVIEW CALLER IN A VIDEO CONFERENCE SESSION

BACKGROUND

Session Initiation Protocol (SIP) is an IETF-defined signaling protocol widely used for controlling communication sessions such as voice and video calls over Internet Protocol (IP). SIP can be used for creating, modifying, and terminating two-party (unicast) or multiparty (multicast) sessions. Sessions may consist of one or several media streams. Other SIP applications include video conferencing, streaming multimedia distribution, instant messaging, presence information, file transfer, and online games. SIP protocol is an Application Layer protocol designed to be independent of the underlying Transport Layer; it can run on Transmission Control Protocol (TCP), User Datagram Protocol (UDP), or Stream Control Transmission Protocol (SCTP). SIP is a text-based protocol, incorporating many elements of the Hypertext Transfer Protocol (HTTP) and the Simple Mail Transfer Protocol (SMTP).

BRIEF DESCRIPTION OF THE DRAWINGS

The accompanying drawings, which are incorporated in and constitute a part of this disclosure, illustrate various embodiments of the present disclosure. In the drawings.

DETAILED DESCRIPTION

Overview

Figure 1:
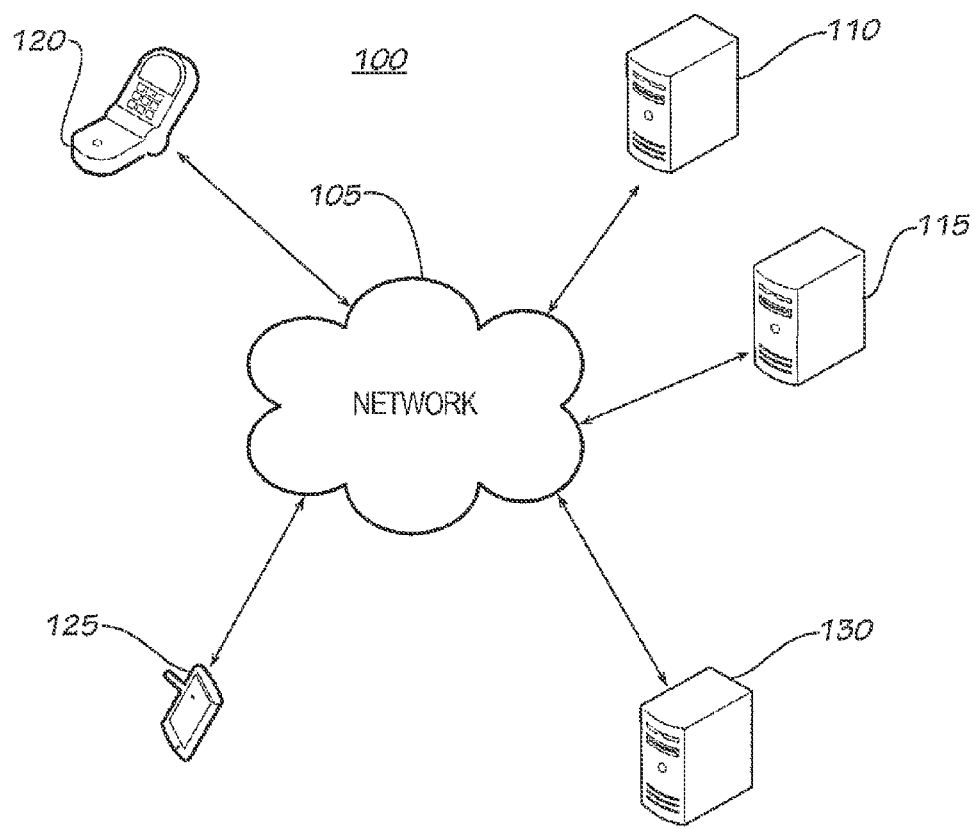
FIG. 1 shows an operating environment.

The concept of caller identification (ID) may be enhanced by taking advantage of video by allowing a call recipient to see who is calling (e.g. a caller) on an incoming video call. The call recipient may be allowed to make a decision to accept or decline the incoming video call based upon who the call recipient sees (e.g. through a live video stream) attempting to contact them.

Both the foregoing overview and the following example embodiment are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiment.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

As the adoption of video communications continues to expand through the adoption of personal communicator products, uses of inter-personal video communications technology may eventually exceed that of traditional voice call communications. Embodiments of the disclosure may enhance the concept of caller ID by taking advantage of video, allowing a call recipient to see (e.g. through a live video stream) who is calling them. Embodiments of the disclosure may allow the call recipient to make a decision to accept or decline incoming video calls based upon whom they see attempting to contact them.

Caller ID was created to identify an incoming caller of a telephone call that fits within the capabilities of a conventional voice call service. Caller ID allows recipients to determine if they want to answer a call, thus avoiding "wrong number" calls, telemarketing services, and even prank calls. Caller ID helps to reduce the number of calls a recipient accepts. But, as the adoption of video communications grows, caller ID may not provide enough "pre-information" as to who is calling and may not leverage the power of video communications.

Currently, telemarketers can mask their identity with fake information, an idea that may carry forward as more and more consumers adopt video communications over traditional voice communications. Today, a call recipient might allow only a select few to "video chat", through the use of buddy lists, but there may become a day when video communications may be utilized much like a call recipient uses a telephone today.

Embodiment of the disclosure may establish video client pre-screening functionality for video communications services. Just as a person may look through the peephole of their front door to see who is at their door, this disclosure may allow a call recipient to establish a one way real-time transport protocol (RTP) media session to see who is calling before the call recipient accept an incoming video call. Furthermore, an added sense of trust and security may be provided for users who are hesitant to adopt video communications giving the user additional visibility into who is really calling them. Moreover, the concept of caller ID, or the use of a static image that represents a caller may be enhanced when the caller's call is received by another user.

Because video communications may be adopted into nearly all forms of communication in the future, embodiments of the disclosure may be software or hardware integrated into consumer, enterprise, and service provider products. Furthermore, embodiments of the disclosure may enhance video conferencing, telepresence, or a remote expert telepresence service, allowing a call center agent to see who is calling ahead of answering the session. In this way, prank calls, and other inappropriate calls may be reduced or eliminated.

FIG. 1 is a block diagram of an operating environment 100. As shown in FIG. 1, operating environment 100 may include a network 105, a proxy server 110, a redirect server 115, a first user device 120, a second user device 125, and a third user device 130. Proxy server 110 and redirect server 115 may provide SIP communication sessions such as voice and video calls over IP between first user device 120, second user device 125, and third user device 130 over network 105.

Network 105 may comprise any type of network (e.g. the Internet, a content delivery network (CDN), etc.) capable of facilitating SIP communication sessions such as voice and/or video calls over Internet Protocol (IP). Moreover, network 105 may facilitate other SIP applications include, but not limited to, video conferencing, streaming multimedia distribution, instant messaging, presence information, file transfer, and online games.

Proxy server 110 may comprise an intermediary entity that acts as both a user agent server (UAS) and a user agent client (UAC) for the purpose of making requests on behalf of other clients. Proxy server 110 may primarily play the role of routing, which means its job may be to ensure that a request is sent to another entity "closer" to the targeted user. Proxy server 110 may also be used to enforce policy (for example, making sure a user is allowed to make a call). Moreover, proxy server 110 may also interpret, and, if necessary, rewrite specific parts of a request message before forwarding it. Proxy server 110 may also serve as a registrar that may accept REGISTER requests and place the information it receives in those requests into the location service for the domain it handles which registers one or more IP addresses to a certain SIP uniform resource locator (URL), indicated by the sip: scheme.

Redirect server 115 may comprise a user agent server that generates 3xx (Redirection) responses to requests it receives, directing the client to contact an alternate set of URIs. Redirect server 115 may allow proxy servers to direct SIP session invitations to external domains.

First user device 120, second user device 125, or third user device 130 may comprise any type of device (e.g. a SIP user agent (UA)) capable of performing SIP communication sessions such as voice and video calls over IP. For example, first user device 120 may comprise a SIP phone, a smart phone, second user device 125 may comprise a tablet computer, and third user device 130 may comprise any type of computing device. First user device 120, second user device 125, or third user device 130 may comprise, but are not limited to, a Wi-Fi access point, a cellular base station, a switch servicing multiple clients in a vicinity, a tablet device, a mobile device, a smart phone, a telephone, a remote control device, a set-top box, a digital video recorder, a cable modem, a personal computer, a network computer, a mainframe, a router, or other similar microcomputer-based device.

A SIP UA may comprise a logical network endpoint used to create or receive SIP messages and manage a SIP session. A SIP UA may perform the role of a user agent client (UAC), which sends SIP requests, and a user agent server (UAS), which receives requests and returns a SIP response. These roles of UAC and UAS may only last for the duration of a SIP transaction. The SIP UA may comprise a physical device such as a telepresence device, or a video conferencing software application that is installed on a personal computer, tablet, or smart phone.

A SIP phone may comprise a SIP user agent that may provide the traditional call functions of a telephone, such as dial, answer, reject, hold/unhold, and call transfer. SIP phones may be implemented as a hardware device or as a softphone. SIP elements may be implemented in the basic firmware functions of many IP-capable devices.

Consistent with embodiments of the disclosure, the call screening functionality may be provided by and between first user device 120 and second user device 125 through, for example, a conventional IP connection between first user device 120 and second user device 125. In other words, embodiments of the disclosure may require no modifications or additions to conventional SIP.

Figure 2:
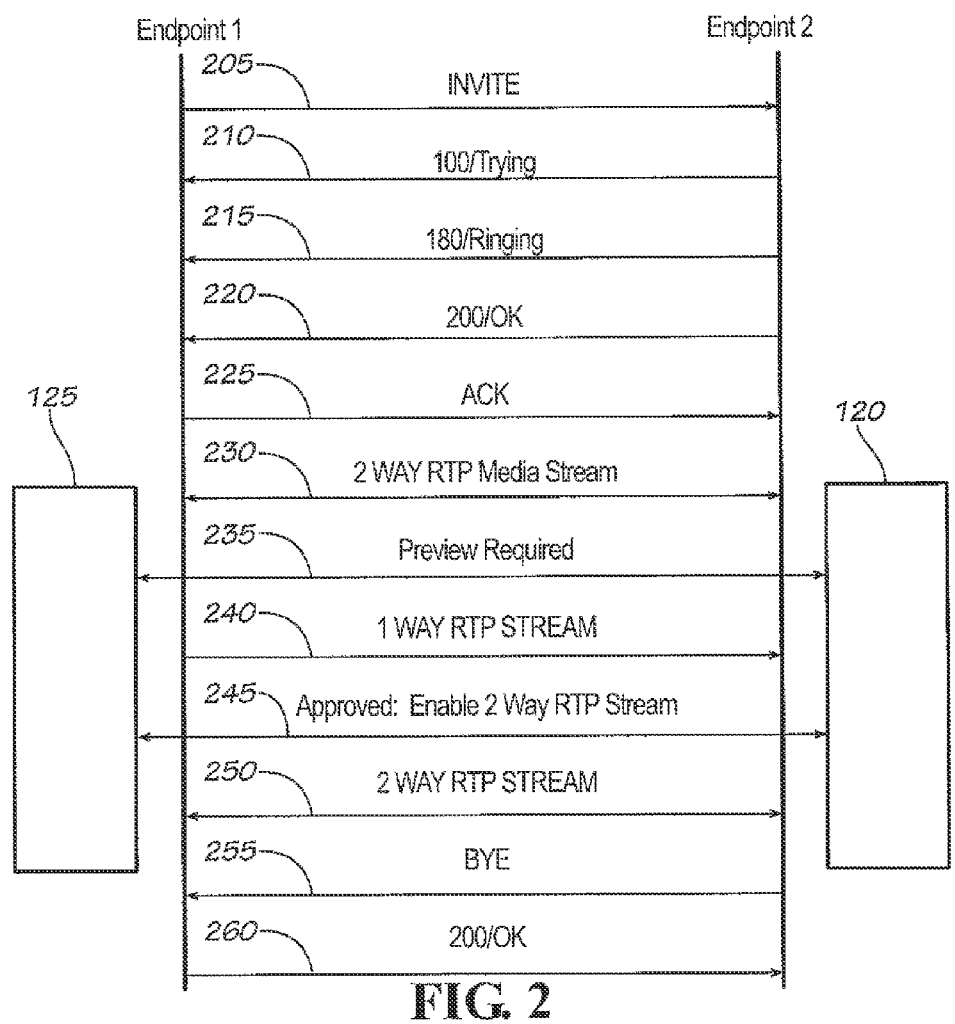
FIG. 2 is a state diagram illustrating caller preview.

FIG. 2 is a state diagram illustrating a call preview. A caller user device (e.g. second user device 125 at endpoint 1) may place a video call to a recipient user device (e.g. first user device 120 at endpoint 2). This call may be established through states 205 through 225 showing standard SIP codes to establish a 2-way RTP media stream (state 230.) After the 2-way RTP media stream is establish, but before a full 2-way video call is established, the recipient user device may require a preview (state 235.) If the caller user device allows the preview, a 1-way RTP stream (state 240) may stream video from the caller user device to the recipient user device. If the recipient user device approves (state 245) of the incoming call, the recipient user device may enable a camera on the recipient user device to send video to the caller user device. The video session may then utilize a full 2-way video call (state 250). This call may be terminated through states 255 through 260 showing standard SIP codes.

Figure 3:
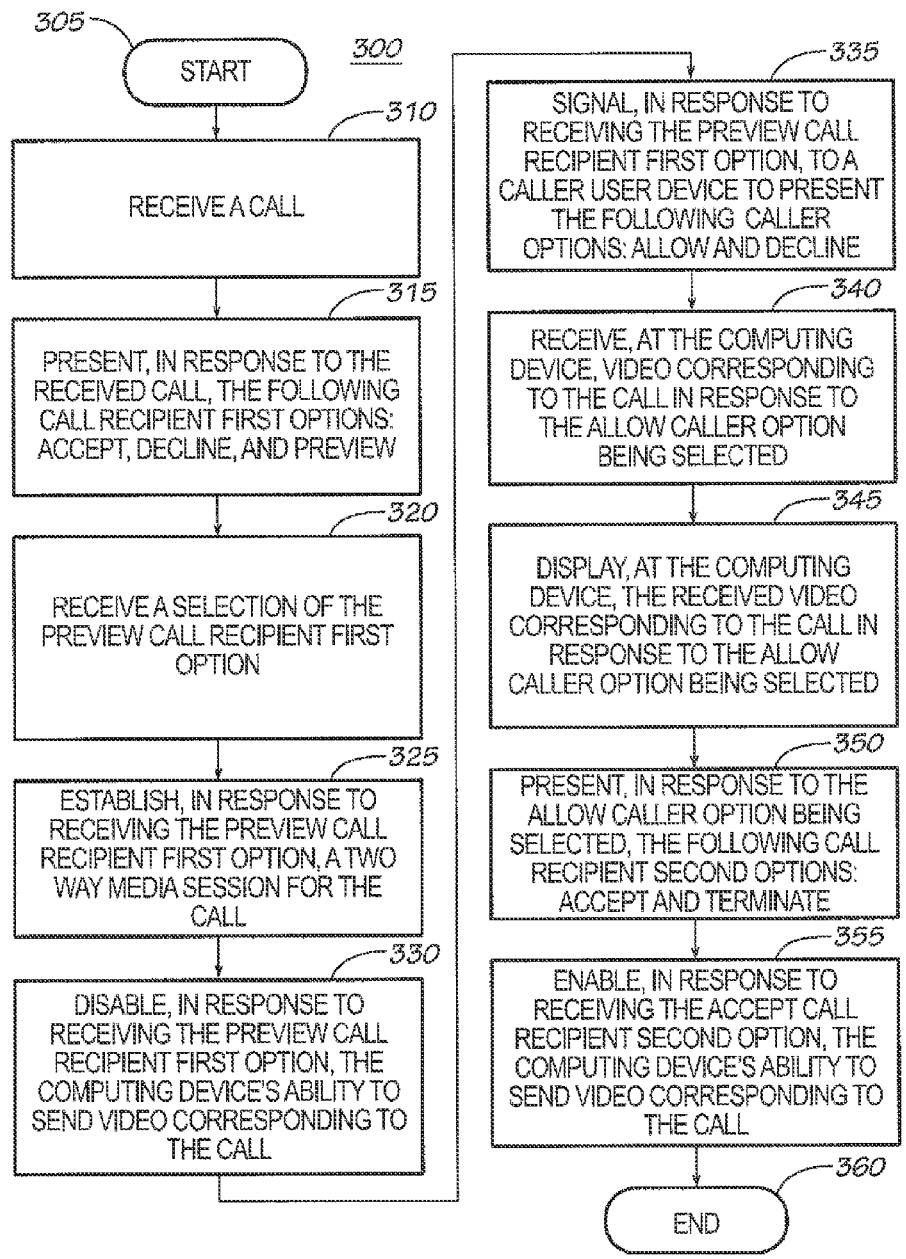
FIG. 3 is a flow chart of a method for previewing a caller.

FIG. 3 is a flow chart setting forth the general stages involved in a method 300 consistent with an embodiment of the disclosure for previewing a caller. Method 300 may be implemented using first user device 120 (e.g. recipient user device) that may utilize a computing device 400 as described in more detail below with respect to FIG. 4. Caller user device may be embodied in second user device 125. Ways to implement the stages of method 300 will be described in greater detail below.

Method 300 may begin at starting block 305 and proceed to stage 310 where first user device 120 may receive a call. For example, second user device 125 may place the call (i.e. a video call) to first user device 120 over network 105.

From stage 310, where first user device 120 receives the call, method 300 may advance to stage 315 where first user device 120 may present, in response to the received call, the following call recipient first options: "accept", "decline", and "preview". For example, a menu may be displayed on first user device 120 to the call recipient, listing the call recipient first options. If "accept" or "decline" is selected by the call recipient from the menu, a normal two-way video call may be established between first user device 120 and second user device 125 or the call may be completely ended respectively.

Once first user device 120 presents the call recipient first options in stage 315, method 300 may continue to stage 320 where first user device 120 may receive a selection of the "preview" call recipient first option. For example, the call recipient using first user device 120 may select "preview" from the menu displayed on first user device 120 listing the call recipient first options.

After first user device 120 receives the selection of the "preview" call recipient first option in stage 320, method 300 may proceed to stage 325 where first user device 120 may establish, in response to receiving the "preview" call recipient first option, a two way media session for the call. For example, when "preview" is selected from the menu on first user device 120, first user device 120 may accept the SIP request for video communication, establishing a two way RTP media session.

From stage 325, where first user device 120 establishes the two way media session, method 300 may advance to stage 330 where first user device 120 may disable, in response to receiving the preview call recipient first option, first user device 120's ability to send video corresponding to the call. For example, even though the two way media session has been established for the call between first user device 120 and second user device 125, neither side of the call may see or hear one another. Specifically, first user device 120 may disable a video camera on first user device 120 thus disabling first user device 120's ability to send video (e.g. to second user device 125.)

Once first user device 120 disables first user device 120's ability to send video corresponding to the call in stage 330, method 300 may continue to stage 335 where first user device 120 may signal, in response to receiving the "preview" call recipient first option, to second user device 125 (i.e. caller user device) to present the following caller options: "allow" and "decline." For example, functionality within first user device 120 may establish a data session with second user device 125 signaling second user device 125 to present the caller with two options: i) "allow" to allow for a one way RTP media session, allowing the call recipient to see who is calling; or ii) "decline"—to decline the request to see who is calling, thus terminating the call.

After first user device 120 signals to second user device 125 to present the caller options in stage 335, method 300 may proceed to stage 340 where first user device 120 may receive, at first user device 120, video corresponding to the call in response to the "allow" caller option being selected. For example, if the caller accepts the request for a video preview, an apparatus instilled within second user device 125 may then stream video from its camera for the call recipient to see via the RTP media session. The caller may have the option to terminate the one way preview RTP media session at any time.

From stage 340, where first user device 120 receives video corresponding to the call, method 300 may advance to stage 345 where first user device 120 may display, at first user device 120, the received video corresponding to the call in response to the "allow" caller option being selected. For example, the caller's face (e.g. through a live video stream) may be displayed on first user device 120. This may allow the call recipient to see who is calling on the incoming video call. Consequently, embodiment of the disclosure may establish video client pre-screening functionality for video communications services. Just as a person may look through a peephole of their front door to see who is at their door, this disclosure may allow the call recipient to establish a one way real-time transport protocol (RTP) media session to see who is calling before the call recipient accepts the incoming video call. Furthermore, an added sense of trust and security may be provided for users who are hesitant to adopt video communications giving the user additional visibility into who is really calling them.

Once first user device 120 displays the received video in stage 345, method 300 may continue to stage 350 where first user device 120 may present, in response to the "allow" caller option being selected, the following call recipient second options: "accept" and "terminate." For example, during the call recipient's preview screening, first user device 120 may present the call recipient with two menu options—to "accept" or "terminate" the incoming video call. Consequently, the call recipient may be allowed to make a decision to accept or decline the incoming video call based upon who the call recipient sees attempting to contact them.

From stage 350, where first user device 120 presents the call recipient second options, method 300 may advance to stage 355 where first user device 120 may enable, in response to receiving the "accept" call recipient second option, first user device 120's ability to send video corresponding to the call. For example, if the call recipient approves of the incoming call and selects the "accept" menu option, first user device 120 may enable the camera on first user device 120. The video session then fully utilizes the two way RTP media session. Consequently, a two way video call is completely established between the caller and the call recipient. If the call recipient disapproves of the video session while viewing the preview video and selects the "terminate" menu option, then the call is terminated. Once first user device 120 enables first user device 120's ability to send video corresponding to the call in stage 355, method 300 may then end at stage 360.

Embodiments of the disclosure may be utilized, for example, in a video conference situation or in a "remote expert" solution, allowing a call center agent to see who is calling ahead of answering a video conference or telepresence session. Because remote expert kiosks may commonly exist in public places, the call center agent can confirm that there is someone actually at the calling kiosk ahead of answering and establishing a two-way session. In the event that the call session was requested as a "prank" by someone passing by the kiosk or if there is someone calling who is "indecent", the call center agent may decline the incoming call request. In the use of the remote expert, the caller may not be prompted for approval of the call "preview", but the call center agent receiving the call within the call center may see who is calling at the time they receive the call request and determine if the call should be answered.

Figure 4:
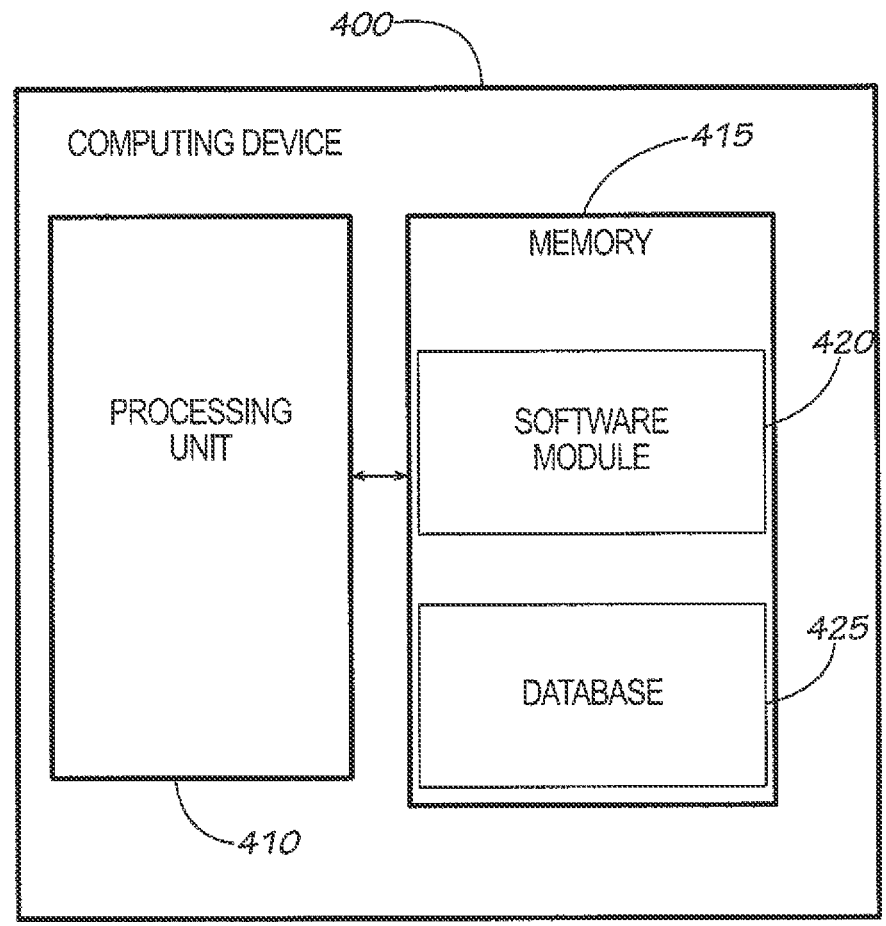
FIG. 4 shows a computing device.

FIG. 4 shows computing device 400 in more detail. As shown in FIG. 4, computing device 400 may include a processing unit 410 and a memory unit 415. Memory unit 415 may include a software module 420 and a database 425. While executing on processing unit 410, software module 420 may perform processes for previewing a caller, including for example, any one or more of the stages from method 300 described above with respect to FIG. 3. Computing device 400, for example, may provide an operating environment for proxy server 110, redirect server 115, first user device 120, second user device 125, or third user device 130. Proxy server 110, redirect server 115, first user device 120, second user device 125, or third user device 130 may operate in other environments and are not limited to computing device 400.

An embodiment consistent with the disclosure may comprise a system for previewing a caller. The system may comprise a memory storage and a processing unit coupled to the memory storage. The processing unit may be operative to receive a call at a recipient user device and present, in response to the received call, the following call recipient first options: accept, decline, and preview. Moreover, the processing unit may be operative to receive a selection of the preview call recipient first option and, in response to receiving the preview call recipient first option: i) establish a two way media session for the call; ii) disable the recipient user device's ability to send video corresponding to the call; and iii) signal to a caller user device to present the following caller options: allow and decline. Furthermore, in response to the allow caller option being selected, the processing unit may be operative to: i) receive, at the recipient user device, video corresponding to the call; ii) display, at the recipient user device, the received video corresponding to the call; and iii) present the following call recipient second options: accept and terminate. The processing unit may also be operative to enable, in response to receiving the accept call recipient second option, the recipient user device's ability to send video corresponding to the call.

Another embodiment consistent with the disclosure may comprise a system for previewing a caller. The system may comprise a memory storage and a processing unit coupled to the memory storage. The processing unit may be operative to initiate a call and then receive a preview request corresponding to the initiated call. Next, the processing unit may allow the preview request and participate in a two-way call in response to acceptance of the call resulting from the allowed preview.

Computing device 400 ("the processor") may be implemented using a Wi-Fi access point, a cellular base station, a tablet device, a mobile device, a smart phone, a telephone, a remote control device, a set-top box, a digital video recorder, a cable modem, a personal computer, a network computer, a mainframe, a router, or other similar microcomputer-based device. The processor may comprise any computer operating environment, such as hand-held devices, multiprocessor systems, microprocessor-based or programmable sender electronic devices, minicomputers, mainframe computers, and the like. The processor may also be practiced in distributed computing environments where tasks are performed by remote processing devices. Furthermore, the processor may comprise, for example, a mobile terminal, such as a smart phone, a cellular telephone, a cellular telephone utilizing Wireless Application Protocol (WAP) or unlicensed mobile access (UMA), personal digital assistant (PDA), intelligent pager, portable computer, a hand held computer, a conventional telephone, or a Wireless Fidelity (Wi-Fi) access point. The aforementioned systems and devices are examples and the processor may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Moreover, the semantic data consistent with embodiments of the disclosure may be analyzed without being stored. In this case, in-line data mining techniques may be used as data traffic passes through, for example, a caching server or network router. Further, the disclosed methods' stages may be modified in any manner, including by reordering stages and/or inserting or deleting stages, without departing from the disclosure.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   receiving a call at a recipient user device comprising a session initiation protocol (SIP) enabled telephone;
   presenting, in response to the received call, call recipient first options;
   receiving a selection of a preview call recipient first option; and
   in response to receiving the preview call recipient first option,
      establishing a two way media session for the call,
      disabling the recipient user device's ability to send video corresponding to the call, and
      signaling to a caller user device to present the following caller options: allow and decline.

2. The method of claim 1, wherein presenting the call recipient first options comprising presenting the following call recipient first options: accept, decline, and preview.

3. The method of claim 1, wherein presenting the call recipient first options comprises presenting the call recipient first options on a display on the recipient user device.

4. The method of claim 1, wherein establishing the two way media session for the call comprises accepting a session initiation protocol (SIP) request for video communication.

5. The method of claim 1, wherein establishing the two way media session for the call comprises establishing a two way real-time transport protocol (RTP) media session.

6. The method of claim 1, wherein disabling the recipient user device's ability to send video corresponding to the call comprises disabling a camera on the recipient user device.

7. The method of claim 1, wherein signaling to the caller user device comprises signaling to the caller user device comprising a session initiation protocol (SIP) enabled telephone.

8. The method of claim 1, wherein signaling to the caller user device comprises signaling to the caller user device comprising a remote expert kiosk.

9. The method of claim 1, further comprising, in response to the allow caller option being selected,
   receiving, at the recipient user device, video corresponding to the call,
   displaying, at the recipient user device, the received video corresponding to the call, and presenting the following call recipient second options: accept and terminate; and enabling, in response to receiving the accept call recipient second option, the recipient user device's ability to send video corresponding to the call.

10. The method of claim 9, wherein enabling the recipient user device's ability to send video corresponding to the call comprises enabling a camera on the recipient user device.

11. A method comprising:
receiving a call from a caller user device;
receiving a preview request corresponding to the initiated call;
allowing the preview request; and
participating in a two-way call in response to acceptance of the call resulting from the allowed preview wherein participating in the two-way call in response to acceptance of the call resulting from the allowed preview comprises establishing a two way media session for the call comprising establishing a two way real-time transport protocol (RTP) media session.

12. The method of claim 11, wherein initiating the call from the caller user device comprises initiating the call from the caller user device comprising a remote expert kiosk.

13. The method of claim 11, wherein initiating the call from the caller user device comprises initiating the call from the caller user device comprising a session initiation protocol (SIP) enabled telephone.

14. The method of claim 11, wherein receiving the preview request comprises receiving the preview request from a recipient user device.

15. The method of claim 11, wherein receiving the preview request comprises receiving the preview request in response to a selection of a preview call recipient first option on a recipient user device.

16. The method of claim 11, wherein receiving the preview request comprises receiving the preview request from a recipient user device comprising a session initiation protocol (SIP) enabled telephone.

17. The method of claim 11, wherein allowing the preview request comprises enabling the caller user device's ability to send video.

18. The method of claim 17, wherein enabling the caller user device's ability to send video comprises enabling a camera on the caller user device.

19. An apparatus comprising:
a memory storage; and
a processing unit coupled to the memory storage, wherein the processing unit is operative to:
receive a call;
present, in response to the received call, a preview call recipient first option;
receive a selection of the preview call recipient first option;
in response to receiving the preview call recipient first option,
establish a two way media session for the call,
disable the apparatus' ability to send video corresponding to the call, and
signal to a caller user device to present an allow caller option wherein the caller user device comprises a remote expert kiosk.

20. The apparatus of claim 10, wherein the apparatus comprises a session initiation protocol (SIP) enabled telephone.

21. The apparatus of claim 19, wherein the processing unit being operative to present the preview call recipient first option comprises the processing unit being operative to present the preview call recipient first option on a display associated with the apparatus.

22. The apparatus of claim 19, wherein the processing unit being operative to establish the two way media session for the call comprises the processing unit being operative to accept a session initiation protocol (SIP) request for video communication.

23. The apparatus of claim 19, wherein the processing unit being operative to establish the two way media session for the call comprises the processing unit being operative to establish a two way real-time transport protocol (RTP) media session.

24. The apparatus of claim 18, wherein the processing unit being operative to disable the apparatus' ability to send video corresponding to the call comprises the processing unit being operative to disable a camera on the apparatus.

25. The apparatus of claim 19, wherein the caller user device comprises a session initiation protocol (SIP) enabled telephone.

26. The apparatus of claim 19, wherein the processing unit is further operative to, in response to the allow caller option being selected,
receive video corresponding to the call,
display the received video corresponding to the call, and
present an accept call recipient second option; and
enable, in response to receiving the accept call recipient second option, the apparatus's ability to send video corresponding to the call.

27. The apparatus of claim 26, wherein the processing unit being operative to enable the apparatus' ability to send video corresponding to the call comprises the processing unit being operative to enable a camera on the apparatus.

\* \* \* \* \*